US007424446B2

(12) United States Patent
Emodi et al.

(10) Patent No.: US 7,424,446 B2
(45) Date of Patent: Sep. 9, 2008

(54) APPARATUS AND METHOD FOR STORING PREDETERMINED MULTIMEDIA INFORMATION

(75) Inventors: Dan Emodi, Tel Aviv (IL); Michael Zevadi, Ramat-Hasharon (IL)

(73) Assignee: Comverse Network System, Ltd., Tel Aviv (IL)

( * ) Notice: Subject to any disclaimer, the term of this patent is extended or adjusted under 35 U.S.C. 154(b) by 730 days.

(21) Appl. No.: 09/861,531

(22) Filed: May 22, 2001

(65) Prior Publication Data

US 2002/0016748 A1 Feb. 7, 2002

Related U.S. Application Data

(63) Continuation of application No. 09/648,532, filed on Aug. 28, 2000, now Pat. No. 7,353,187.

(60) Provisional application No. 60/207,194, filed on May 26, 2000.

(51) Int. Cl.
*G06Q 30/00* (2006.01)
*G06F 17/30* (2006.01)

(52) U.S. Cl. .................. 705/26; 705/1; 705/27

(58) Field of Classification Search ........ 379/374, 379/114.2, 112.01, 114.05, 114.1; 211/40; D14/178; 395/200.41; 709/203; 369/24.01; 340/825.24, 825.72; 345/733, 747, 764–765; 705/26–27, 1; *G09B 15/02; G10H 1/26*
See application file for complete search history.

(56) References Cited

U.S. PATENT DOCUMENTS

| | | | | |
|---|---|---|---|---|
| 4,870,515 A | * | 9/1989 | Stokes | 360/72.2 |
| 5,455,854 A | * | 10/1995 | Dilts et al. | 379/201.04 |
| 5,464,946 A | * | 11/1995 | Lewis | 84/609 |
| 5,625,608 A | * | 4/1997 | Grewe et al. | 369/24.01 |
| 5,661,787 A | | 8/1997 | Pocock | |
| 5,722,418 A | * | 3/1998 | Bro | 600/545 |
| 5,724,482 A | * | 3/1998 | Grewe et al. | 704/501 |
| 5,745,642 A | * | 4/1998 | Ahn | 386/95 |
| 5,782,692 A | * | 7/1998 | Stelovsky | 463/1 |
| 5,799,063 A | * | 8/1998 | Krane | 379/88.17 |

(Continued)

FOREIGN PATENT DOCUMENTS

AU 200155841 A * 10/2001

(Continued)

OTHER PUBLICATIONS

Derwent-Acc-No. 2002-137814, Dec. 10, 2000, MP3 box for audio sets in vehicle.*

(Continued)

*Primary Examiner*—Jeffrey A. Smith
*Assistant Examiner*—William J. Allen
(74) *Attorney, Agent, or Firm*—Sughre Mion, PLLC

(57) ABSTRACT

An apparatus for storing predetermined multimedia information is provided. The apparatus includes a telephony platform and a storage location coupled to the telephony platform. The storage location stores predetermined multimedia information corresponding to a plurality of predetermined information tracks, and the telephony platform receives at least one multimedia command from an access device of a user. The multimedia command enables the user to access a service of the apparatus relating to a particular information track of the predetermined information tracks. Also, the telephony platform charges the user a fee for accessing the service.

25 Claims, 4 Drawing Sheets

U.S. PATENT DOCUMENTS

| | | | | |
|---|---|---|---|---|
| 5,822,216 | A * | 10/1998 | Satchell et al. | 700/232 |
| 5,860,068 | A * | 1/1999 | Cook | 705/26 |
| 5,926,789 | A * | 7/1999 | Barbara et al. | 704/270.1 |
| 5,986,200 | A * | 11/1999 | Curtin | 84/609 |
| 5,991,601 | A * | 11/1999 | Anderson | 340/7.1 |
| 5,991,737 | A * | 11/1999 | Chen | 705/26 |
| 6,182,128 | B1 * | 1/2001 | Kelkar et al. | 725/87 |
| 6,286,139 | B1 * | 9/2001 | Decinque | 725/5 |
| 6,320,947 | B1 * | 11/2001 | Joyce et al. | 379/114.2 |
| 6,343,115 | B1 * | 1/2002 | Foladare et al. | 379/88.17 |
| 6,459,776 | B1 * | 10/2002 | Aktas et al. | 379/88.13 |
| 6,502,194 | B1 * | 12/2002 | Berman et al. | 726/28 |
| 6,525,747 | B1 * | 2/2003 | Bezos | 715/751 |
| 6,578,072 | B2 * | 6/2003 | Watanabe et al. | 709/217 |
| 6,587,127 | B1 * | 7/2003 | Leeke et al. | 345/765 |
| 6,607,136 | B1 * | 8/2003 | Atsmon et al. | 235/492 |
| 6,636,773 | B1 * | 10/2003 | Tagawa et al. | 700/94 |
| 6,657,116 | B1 * | 12/2003 | Gunnerson | 84/615 |
| 6,684,030 | B1 * | 1/2004 | Taylor et al. | 398/59 |
| 6,879,963 | B1 * | 4/2005 | Rosenberg | 705/26 |
| 6,934,690 | B1 * | 8/2005 | Van Horn et al. | 705/26 |
| 6,947,909 | B1 * | 9/2005 | Hoke, Jr. | 705/54 |
| 7,209,892 | B1 * | 4/2007 | Galuten et al. | 705/26 |
| 2002/0023015 | A1 * | 2/2002 | Hughes et al. | 705/26 |
| 2002/0072978 | A1 * | 6/2002 | Odom et al. | 705/26 |
| 2003/0009385 | A1 * | 1/2003 | Tucciarone et al. | 705/26 |
| 2003/0021441 | A1 * | 1/2003 | Levy et al. | 382/100 |
| 2003/0188313 | A1 * | 10/2003 | Ellis et al. | 725/60 |
| 2005/0192871 | A1 * | 9/2005 | Galuten et al. | 705/26 |
| 2006/0190966 | A1 * | 8/2006 | McKissick et al. | 725/61 |

FOREIGN PATENT DOCUMENTS

| | | | |
|---|---|---|---|
| KR | 2002004907 A * | 1/2002 | |
| WO | WO 200223521 A1 * | 3/2002 | |

OTHER PUBLICATIONS

TDB-Acc-No. NNRD45294, A scheduling algorithm for transferring smaller sized files faster than larger sized files for multi-threaded data transfer applications, IBM technical disclosure bulletin, Dec. 2001, UK.*

TDB-Acc-No. NN9403413, Multimedia mixed object envelopes supporting a graduated fee scheme via encryption, Mar. 1, 1994 IMM Technical Disclosure Bulletin, Mar. 1994, vol. 37, issue 3, pp. 413-418.*

TDB-Acc-No. NB9209291, Calling card interface for visual telephony, Sep. 1, 1992.*

From Internet: Howstuffworks "How DVDs Work" infor. about music & picture tracks (http:./electronics.howstuffworks.com/dvd.html, a hard-copy was printed on May 20, 2005.*

"Ztango.com WAP Gateway Powers iobox Commercial WAP services Rollout". PR Newswire. Feb. 2, 2000. [recovered from Proquest database Jul. 5, 2007].*

"Music for the net generations". Deeks, Richard. Sunday Times. Apr. 23, 2000. [recovered from Proquest database Jul. 5, 2007].*

"Want to stop Napster? Forget it—it's too late". Gurley, j. Fortune. May 1, 2000. [recovered from Proquest database Jul. 5, 2007].* sputnik7.com and Music Choice Give Fans What They Want; Music Choice Streaming Music Audio Channels Now Featured on sputnik7.com. PR Newswire , p. 8194 , Jun. 14, 1999 [recovered from Dialog search on Jul. 4, 2008].*

* cited by examiner

| CD | MUSIC TRACK | MAILBOX |
|---|---|---|
| CD1 | Music Track 1 | Mailbox 1 |
| | Music Track 2 | Mailbox 2 |
| | * * * | * * * |
| | Music Track N | Mailbox N |
| CD2 | Music Track 1 | Mailbox N+1 |
| | Music Track 2 | Mailbox N+2 |
| | * * * | * * * |
| | Music Track M | Mailbox N+M |
| * * * | | |
| CDx | Music Track 1 | Mailbox X |
| | Music Track 2 | Mailbox X+1 |
| | * * * | * * * |
| | Music Track Z | Mailbox X+Z |

Fig. 4

APPARATUS AND METHOD FOR STORING PREDETERMINED MULTIMEDIA INFORMATION

RELATED APPLICATIONS

The present application is a continuation application of U.S. application Ser. No. 09/648,532, filed Aug. 28, 2000 now U.S. Pat. No. 7,353,187. Such application is incorporated herein by reference for all purposes.

Also, the present application claims the benefit of U.S. Provisional Application No. 60/207,194, filed May 26, 2000. Such application is incorporated herein by reference for all purposes.

FIELD OF INVENTION

The present invention relates to a system that enables a user to remotely access multimedia and customize various multimedia products. More particularly, the present invention relates to a system that uses a telephony platform and a telephony infrastructure to enable a user to remotely access multimedia and customize various multimedia products. In addition, the present invention relates to a method performed by the system.

BACKGROUND OF THE INVENTION

Due to the advancements in technology over the past several decades, the amount of multimedia information available to the average consumer has grown substantially. For example, with respect to musical information, improvements in radio broadcasting and audio electronics have enabled users to listen to a wide variety of radio programming while they are sitting in their homes, driving in their automobiles, relaxing at the beach, or exercising. Also, with the creation and expansion of "music television" channels in the past couple of decades, music information is readily conveyed to television viewers in the form of "music videos".

As a result of such widespread dissemination of music information, the purchasing of reproducible music media (e.g. music records, cassettes, and compact disks ("CDs")) has become impulsive. In a typical scenario, a user listens to the radio and hears a particular song that appeals to him or her. Then, the user impulsively purchases a CD containing the particular song or containing a song that is similar to the particular song. In addition to becoming impulsive, the purchasing of reproducible music media has also become sociable. Specifically, frequent topics of discussion among a user and his or her friends are the newest songs that are being broadcast on the radio. After discussing such songs, the user often decides to purchase a CD containing one or more of the songs.

In most cases, when a user wants to purchase a CD or other type of music media, he or she must physically go to a music media store to buy the music media. The vast majority of music media stores are owned by large record companies or large distribution companies, and other music media stores are smaller, family-owned music shops. However, travelling to a store to buy a CD (or other music media) requires a substantial amount of time and is inconvenient for the user. Thus, since many CD purchases are impulsive, the desire to buy a particular CD often wanes before the user can find the time to travel to a music store to buy the CD. As a result, many CDs that users initially desire to purchase are never bought, and thus, many potential CDs sales are lost.

In addition, a user typically cannot listen to the contents of the entire CD before purchasing the CD, and in many cases, the user does not like the majority of the songs on the CD after he or she has bought the CD and listened to it. In such a case, the user must travel to the store for a second time to return the CD for a refund, and the multiple trips to the music store add to inconvenience of the user. Furthermore, to prevent unscrupulous users from purchasing music media, illegally copying the music media via a recording device, and returning the original music media for a refund, many stores do not allow users to return music media once the packaging of the music media has been opened. Thus, if a user cannot listen to a CD before purchasing it and does not like the majority of the songs on the CD after buying the CD, the user cannot return the CD. In such a scenario, the user has spent money to buy a CD that he or she does not like and cannot return for a refund. Such a practice further discourages users from buying CDs from a music store.

Recently, the Internet has created new channels for distributing multimedia. For example, Internet applications (e.g. on-line music stores) have been developed that enable a user to purchase music media via his or her computer. One example of such an Internet application is the CDNow application. Such application enables a user to login to the website and search for a particular CD. When the user finds the particular CD, the CDNow application enables the user to listen to a sample from the music tracks of the CD in real time. In addition, if the user submits the appropriate credit card information, the CDNow application enables the user to purchase the CD and (1) download MP3 data containing the tracks of the CD or (2) have the CD mailed to an address designated by the user. Furthermore, the CDNow application enables a user to select his or her favorite musical tracks from different CDs and combine them to create a personalized CD. Then, the user can submit the appropriate credit card information to download the MP3 data containing the tracks of the personalized CDs.

As noted above, purchasing CDs via on-line music stores is more convenient than purchasing CDs via conventional music stores. However, purchasing CDs via on-line music stores still have many disadvantages. For example, the on-line stores are totally inaccessible to users who do not know how to use a personal computer and to users who do not have access to a personal computer. Since many music media purchases are impulsive and the desire to impulsively purchase music media diminishes relatively quickly, many users lose interest in buying a particular CD before they are able to access an on-line store or learn how to access an on-line store. In addition, since the on-line music stores require a credit card to purchase a CD, many users who do not have a credit card (e.g. children and some young adults) cannot utilize the on-line stores to make the purchase. As a result, many potential CD sales via the on-line stores never materialize.

Another problem with on-line stores is that the Internet is unstable, unreliable, and prone to delays. For example, a user often cannot access an on-line store because a high volume of data traffic exists on the Internet or because the Internet connection between the server running the on-line store and the user's personal computer is faulty. Furthermore, even after the user successfully accesses the on-line store, the user often cannot listen to high quality samples of music tracks because the data traffic on the Internet is high and/or because the connection is unstable. Thus, many users trying to access and/or purchase music from an on-line store become frustrated, the impulsive purchasing behavior of the users becomes crippled, and potential sales of many CDs are lost.

Also, although on-line music stores are generally more convenient than conventional music stores and initially increase the sales of CDs, such stores may actually detract from the sale of CDs over time. Specifically, users typically pay a fee (via a credit card) to the on-line store to download music data for a particular CD. Such music data represents a high quality rendition of the tracks on the CD, and once the data is downloaded, the user can easily make multiple copies of the data and redistribute the data. Thus, after an initial user purchases the music data, he or she can distribute the data to many other users. As a result, the other users, who would otherwise purchase the particular CD, do not buy the CD because they have already received the data from the initial user.

SUMMARY OF THE INVENTION

One object of the present invention is to overcome the above and other problems and disadvantages associated with the prior art.

Another object of the present invention is to provide an apparatus for storing multimedia information and enabling multiple users to access and purchase such information quickly and reliably.

A further object of the present invention is to provide a method for storing multimedia information and enabling multiple users to access and purchase such information quickly and reliably.

In order to achieve the above and other objects, an apparatus for storing predetermined multimedia information is provided. The appartus comprises: at least a first telephony platform; at least a first storage location coupled to said at least said first telephony platform; and a second storage location coupled to said at least said first telephony platform, wherein said at least said first telephony platform receives at least one multimedia command from an access device of a user, wherein said at least first storage location and said second storage location store said at least said part of said predetermined multimedia information, wherein a first multimedia portion of said predetermined multimedia information is stored in said at least first storage location and a second multimedia portion of said predetermined multimedia information is stored in said second storage location, wherein said at least said first telephony platform selectively reproduces one of said first multimedia portion and said second multimedia portion as a selected multimedia portion based on said at least one multimedia command, and wherein said at least said first telephony platform outputs said selected multimedia portion to said access device.

In order to additionally achieve the above and other objects, a method for storing predetermined multimedia information is provided. The method comprises: (a) providing at least a first telephony platform and at least a first storage location coupled to said at least said first telephony platform; (b) providing a second storage location coupled to said at least said first telephony platform; (c) storing at least a part of said predetermined multimedia information in said at least first storage location and said second storage location, wherein a first multimedia portion of said predetermined multimedia information is stored in said at least first storage location and a second multimedia portion of said predetermined multimedia information is stored in said second storage location, and wherein said method further comprises: (d) receiving at least one multimedia command from an access device of a user via said at least said first telephony platform; (e) selectively reproducing one of said first multimedia portion and said second multimedia portion as a selected multimedia portion based on said at least one multimedia command; and (f) outputting said selected multimedia portion to said access device from said at least said first telephony platform.

BRIEF DESCRIPTION OF THE DRAWINGS

The above and other objects and advantages of the present invention will become more apparent by describing in detail preferred embodiments thereof with reference to the attached drawings in which:

FIG. 4 shows an illustrative embodiment of the manner in which multimedia information is stored in the telephony messaging platform shown in FIG. 1.

DETAILED DESCRIPTION OF THE PREFERRED EMBODIMENTS

The following description of the preferred embodiments discloses specific configurations, components, and processes. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and processes of the present invention that would have been known to one skilled in the art are omitted for the sake of clarity and brevity.

Figure 1:
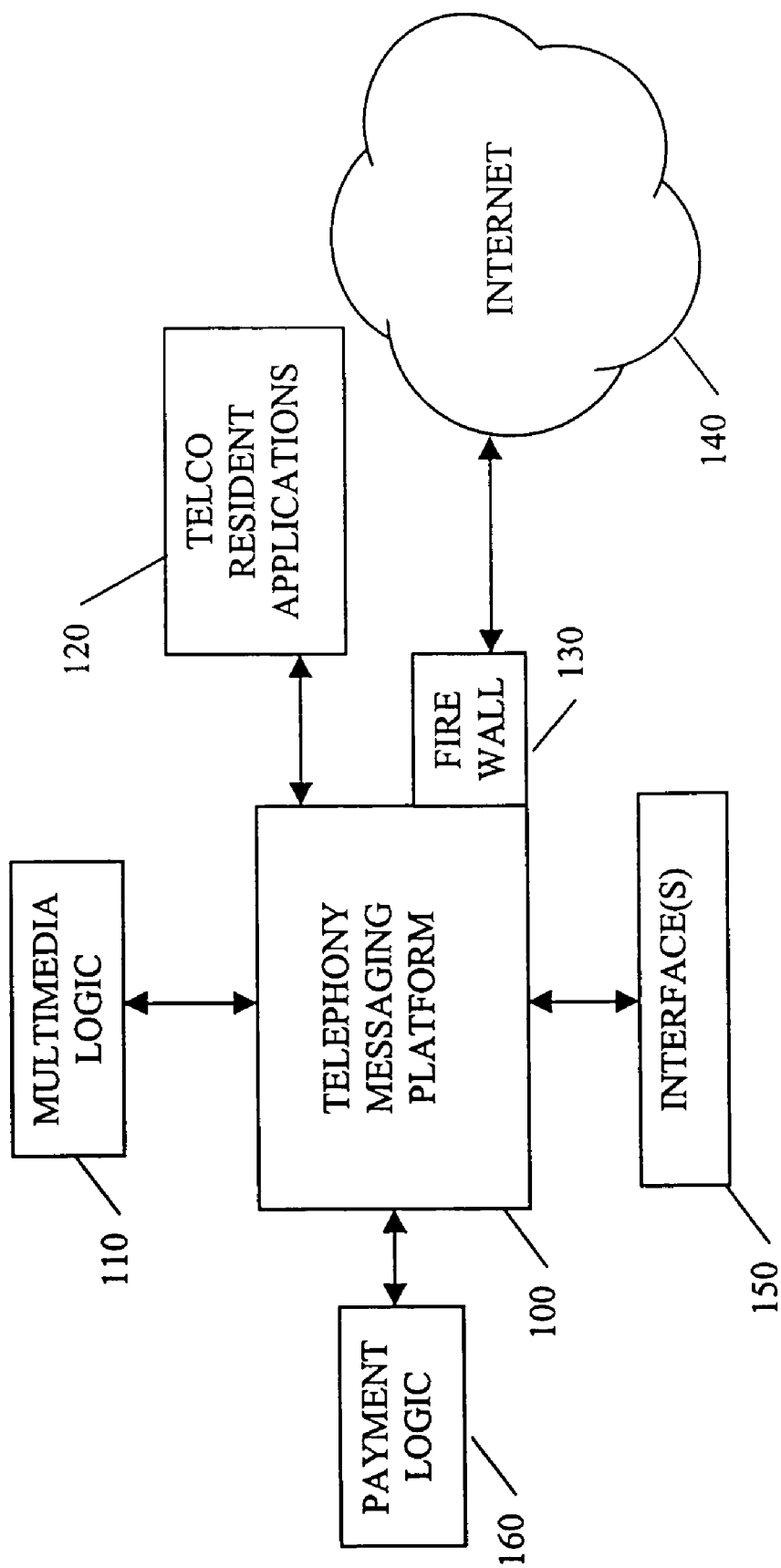
FIG. 1 shows an illustrative embodiment of the structure of a multimedia system that stores multimedia information.

The present invention relates to a multimedia system that enables a user to remotely access multimedia and customize various multimedia products. In an illustrative, non-limiting embodiment, the multimedia system uses a telephony platform and a telephony infrastructure to store multimedia information, and a user can remotely access such information via various access devices. In one implementation, the multimedia relates to music data, and one example of a multimedia system that stores music data is illustrated in FIG. 1.

As shown in the figure, the multimedia system contains a telephony messaging platform 100, multimedia logic 110, telco resident applications 120, a firewall 130, interfaces 150, and payment logic 160. The messaging platform 100 stores at least some of the music data. In an illustrative example, the music data contains a plurality of music tracks for a plurality of CDs, and the music tracks are respectively stored in a plurality of storage locations. At least some of the storage locations may be located within a single memory chip within the platform 100 or may be located within separate memory chips within the plaftform 100, but the storage locations are preferably on high-capacity computer storage devices, such as disks. Furthermore, some of the storage locations may be contained in another messaging platform (not shown) such that some music tracks are stored and within the platform 100 and some music tracks are stored within the other platform (not shown).

In another embodiment, the messaging platform 100 may store "pointers" or "links" to storage locations contained in other platforms (not shown). By using the pointers or links, the amount of memory required for the platform 100 is substantially reduced. Also, in such a scenario, the messaging platform 100 may store some music tracks and some pointers or links or may store only pointers or links.

By storing the music data in a plurality of messaging platforms (which may be physically located near each other or remotely from each other), several advantages may be achieved. For example, since all of the music tracks are stored within a plurality of platforms, the number of tracks stored within each platform is reduced. As a result the amount of memory used within each platform is reduced and the speed with which the music data is accessed is increased. Also, if each platform is dedicated to storing certain titles, categories, or types of music tracks, the speed with which the tracks can be accessed is further increased because the corresponding requests to access the tracks can be more efficiently routed to the appropriate platform. In addition, by redundantly storing the same music track (e.g. a very popular music track) at multple platforms, the load on the entire system is reduced because multiple platforms can handle multiple requests for the same popular music track. Furthermore, by storing multiple music tracks in separate platforms, various load balancing techniques can be utilized to increase the speed and efficiency at which the system operates.

In a further embodiment, the storage locations may correspond to mailboxes within the messaging platform 100 (and/or other platforms). For example, the mailboxes may resemble voice mailboxes that are typically used to store voice messages when a caller dials a telephone number corresponding to a recipient's telephone, but the recipient is not available to answer the telephone. In such a scenario, a plurality of tracks for a CD may be respectively stored in a plurality of mailboxes.

In the examples above, each storage location or mailbox stores a music track of a CD, but the present invention clearly is not limited to such a situation. For example, the music data relating to an entire CD or a selected portion of a CD may be stored in a particular mailbox. Alternatively, music data for a plurality CDs may be stored in a particular mailbox.

The multimedia logic 110 contains the hardware and/or software logic for controlling the multimedia system. Such logic 110 could reside on top of the management component of the messaging platform 100 or interface with it as an external component.

Also, the telco resident application 120 contains the hardware and/or software for performing various interactive applications such as chat rooms, forums, and other applications. Such applications will be described in more detail below.

The firewall 130 is hardware and/or software logic that prevents unauthorized access to the information stored on the messaging platform 100. Such a firewall 130 is typically used to enable authorized users to access the data contained on the platform 100 via the Internet 140, while preventing unauthorized users to access the platform 100 via the Internet 140. Also, a Demilitarized Zone ("DMZ") may be located between the firewall 130 and the messaging platform 100 to provide a virus free safe zone before the entrance into the proprietary operating system of the platform 100.

The interface 150 contains the hardware and/or software necessary to enable users to communicate with the messaging platform 100 via various access devices. Specifically, a particular access device transmits data and commands via an access device protocol, and the telephony messaging platform 100 processes data and commands in accordance with a messaging platform protocol. The interface 150 converts the particular access device protocol into the messaging platform protocol (and vice versa) so that the particular access device can communicate with the telephony messaging platform 100. Examples of the access device include (but are not limited to) wireline telephones, cellular devices, mobile radios, voice pagers, personal computers, etc. In addition, examples of various protocols and interfaces that may be used include (but are not limited to) the Interactive Voice Response ("IVR") protocol, Natural Language Voice ("NLV") protocol, Wireless Application Protocol ("WAP"), Short Message Service ("SMS") protocol, Subscriber Identity Module ("SIM") Took Kit ("STK"), Unstructured Supplementary Service Data ("USSD"), Hyper Text Markup Language ("HTML"), etc.

With respect to the IVR protocol, an automated database asks the user questions, and the user responds. Typically, the user responds by pressing one or more buttons on the telephone, but in some implementations, the user may respond with normal speech, which is recognized by the IVR interface via automatic speech recognition techniques. Then, a database receives and processes the answer and asks the next question based on the previous answer.

The WAP protocol allows the formatting and sending of Internet information via radio frequency to wireless terminals. This protocol does not convey the entire page, but rather strips the relevant information from the Internet page and sends the relevant information to the wireless terminal.

The SMS protocol is a service that allows a system to send a short alphanumeric message (typically up to 160 characters) via a cellular radio channel. Such an interface was pioneered by GSM operators, but it is now also available on non-GSM systems such as Time Division Multiple Access ("TDMA") and Code Division Multiple Access ("CDMA") systems.

The STK protocol uses a SIM card, which is a small card that includes a microprocessor and memory chip and which "belongs" to a specific user. When the user inserts the SIM card into an electronic device (e.g. a cellular phone), the cellular phone is identified by the system as the user's phone. Furthermore, if the user takes the SIM card out of the first phone and puts it into a second phone, the first phone ceases to be identified with the user, and the second phone is identified as the user's phone. Furthermore, the user does not have to change any numbers, identity information, services, etc. to use the second phone. The SIM concept was used first for GSM systems but has spread to non-GSM systems.

The USSD protocol is similar to the SMS interface and is another protocol for stripping information off the Internet to be sent via radio frequency to mobile terminals. However, the SMS interface is a "one-message" service only. Specifically, an SMS message can be sent to a user and read by the user. Afterwards, the user sends his or her own SMS response. After the user's response is sent, the user receives another reply. As shown above, each SMS message is sent separately. On the other hand, the USSD interface is a session-oriented protocol, which creates a continuing connection between the user and the network until the exchange of messages is done. The difference between the SMS and USSD interfaces might be akin to the difference between packet switching (where each packet is routed separately) versus circuit switching (where the connection remains open during the interaction). However, all messages, whether SMS or USSD messages, are digital packets.

The HTML protocol is a protocol that is widely used to communicate among many types of Internet applications.

The payment logic 150 contains the hardware and/or software necessary to enable users to pay for access to the messaging platform 100, to pay for listening to music tracks stored on the platform 100, and/or to purchase a CD via the multimedia system. For example, the payment logic 150 may enable a user to pay for various services or products by using a credit card. In one implementation, the user pays with a credit card via an IVR or voice interface, much like a "Ticketmaster" application. In addition, the payment logic 150 may enable the user to pay for services or products by deducting the cost of the services or products from a pre-paid account that the user has previously established with the multimedia system. Also, the payment logic 150 may generate a bill requesting that the user pay for services or products and may instruct a billing system or department within the multimedia system to mail or e-mail the bill to the user. Furthermore, the payment logic 150 may enable the user to pay for services or products via a coupon as described below. The payment logic 150 may be a one-way interface to simplify communication from the user to the multimedia system such that the user ceases interacting with the messsaging platform 100 after deciding to access the payment logic 150 and purchase a selected service or product. Alternatively, the payment logic 150 may be a two-way interface that enables the user to continue to interact with the messaging platform 100 after purchasing a product or service.

Also, although not illustrated in FIG. 1, the multimedia system may contain various other interfaces that allow the user and the multimedia vendor to track and analyze various aspects of the user's interaction with the messaging platform 100. For example, such interfaces may determine how frequently the user accesses the platform 100, the durations that the user accesses the platform 100, the types of products or services that the user purchases via the platform 100, etc. Such information is particularly useful for the multimedia vendor for analyzing the purchasing habits of various users and marketing certain products or services to certain types of users.

Figure 2:
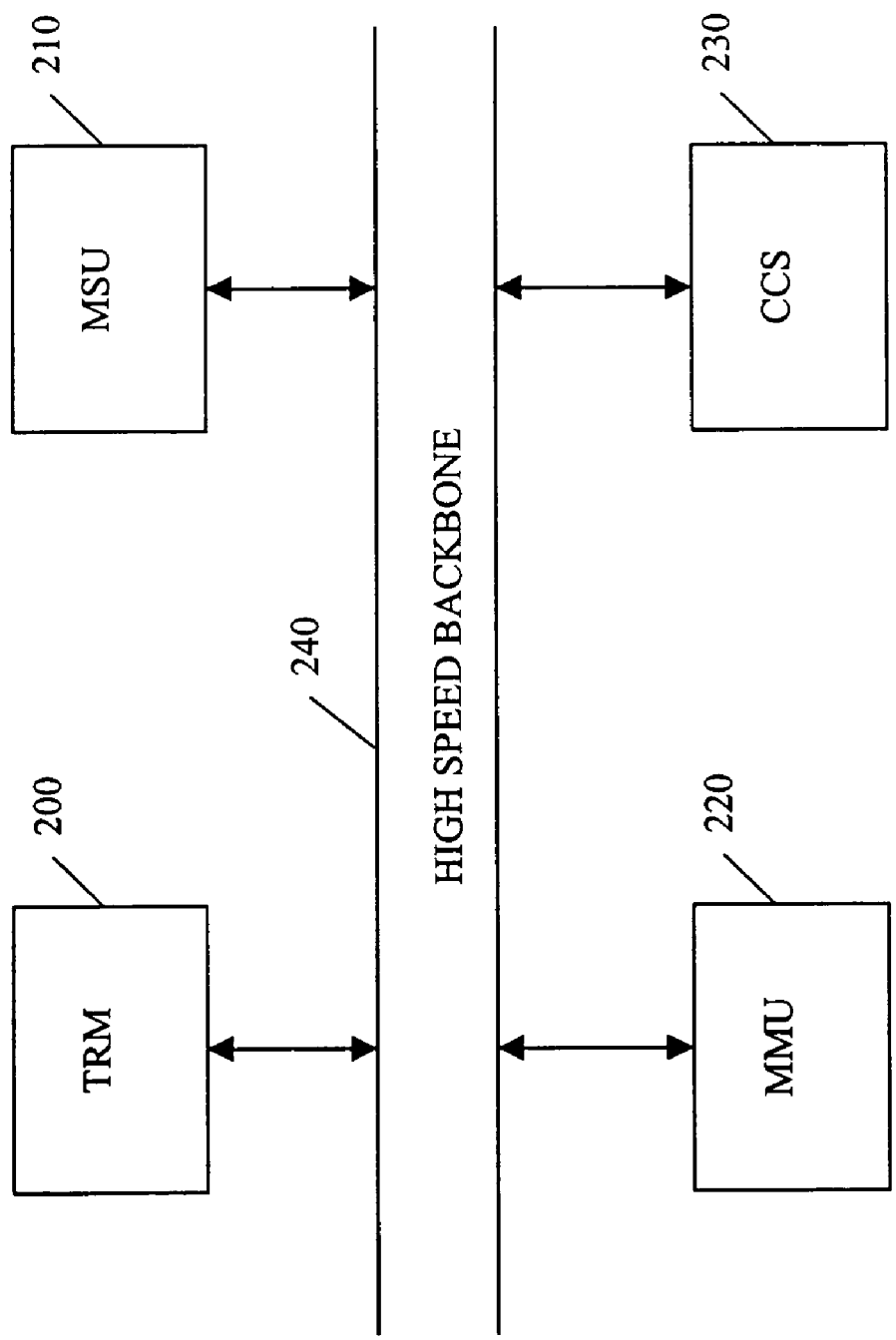
FIG. 2 shows an illustrative embodiment of the structure of the telephony messaging platform shown in FIG. 1.

A non-limiting example of the detailed structure of the telephony messaging platform 100 is the Trilogue INfinity system, and an example of the architecture of the system is illustrated in FIG. 2. The Trilogue INfinity system is available from Comverse Network Systems, Inc., Wakefield, Mass. This system comprises a Trilogue Manager ("TRM") 200, a Messaging and Storage Unit ("MSU") 210, a Multi Media Unit ("MMU") 220, a Call Control Server ("CCS") 230, and a high speed backbone 240 that interconnects the TRM 200, the MSU 210, the MMU 220, and the CCS 230.

The TRM 200 is the management and control unit of the messaging platform 100. In addition, the TRM 200 is the central access point for external interfaces, administration, billing, and alarm functions.

The MSU 210 handles message storage and retrieval, including formatting, storage, and transmission of data. In essence, the MSU 210 is an application server for the messaging platform 100 that stores music data (or links to music data) and enables users to access the music data (or links) and forward the music data (or links) to other users in the manner described below. As indicated above, the MSU 210 stores the music data in existing mailboxes in a way that is similar to the way in which voice mail is stored in voice mail boxes of conventional telephone networks. Such an architecture enables many users to quickly and reliably access music data concurrently.

The MMU 220 is the front-end of the Trilogue INfinity system and is connected directly to the external telephone system. The MMU converts the telephone signal (which usually arrives in an SS7 format and protocol) into a message suitable for the Trilogue INfinity system. The MMU is bidirectional, and thus, it receives messages from the telephony system and also sends messages from the Trilogue INfinity system to the user, thereby allowing user interaction with the system.

The CCS 230 is a controller for the network and generates control signals for all parts of the messaging platform 100.

As described above, the messaging platform 100 in the multimedia system uses several key features that are common to many electronic messaging systems. Also, although the specific example described above implements the Trilogue INfinity system as the messaging platform 100, the present invention is not limited to such a system. Clearly, one skilled in the art will appreciate that the invention may use any electronic messaging platform with any architecture, provided that such a platform has storage and communication capabilities.

Figure 3:
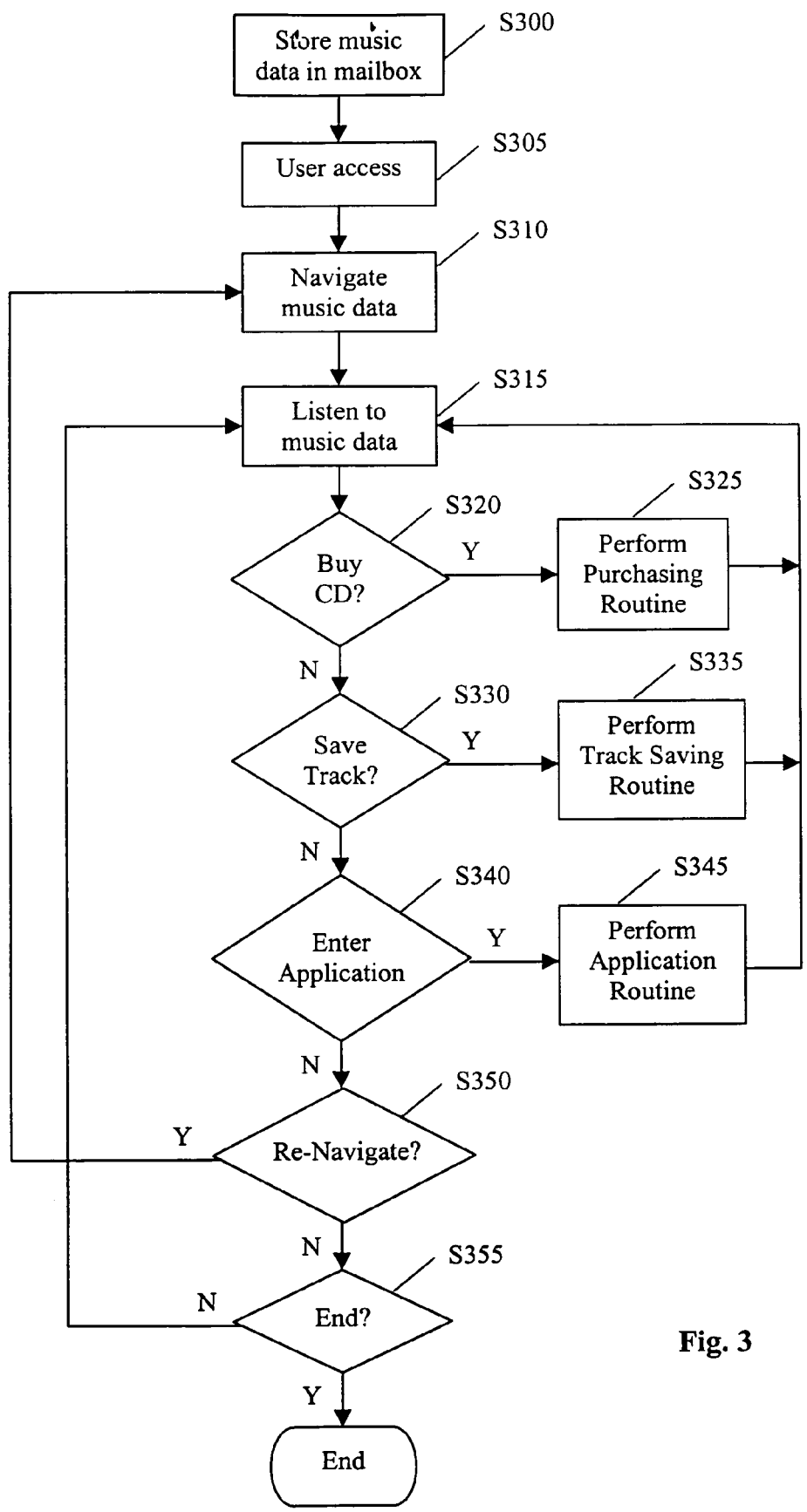
FIG. 3 shows an illustrative embodiment of various routines performed by the multimedia system shown in FIG. 1.

An example of a process that is performed by the multimedia system is illustrated in FIG. 3. As shown in the figure, music data is stored on the telephony messaging platform 100 (operation S300). In one implementation, music data for each music track of a plurality of CDs is stored as a separate message in a particular mailbox. For instance, as shown in FIG. 4, music tracks 1 to N for a first CD1 are respectively stored in mailboxes 1 to N. Music tracks 1 to M for a second CD2 are stored in mailboxes N+1 to N+M. In addition, other music tracks for other CDs are sequentially stored in mailboxes within the platform 100 in a similar manner. Alternatively or additionally, pointers or links may be stored in the platform 100 that identify mailboxes which store music tracks and which are not located within platform 100.

After the music tracks are stored on the messaging platform 100, a user may access the stored music data (operation S305). For example, a user may use an access device (e.g. a telephone) to dial a telephone number corresponding to the telephony messaging platform 100, and the platform 100 establishes an initial communication connection with the access device. Afterwards, the user may be required to input a user code and corresponding password via a touch tone key pad of the access device. If an incorrect user code and/or password is input, the messaging platform 100 may prompt the user to reinput the user code and/or password. If the incorrect user code and/or password are repeatedly input a predetermined number of times, the platform 100 may terminate the communication connection with the access device.

On the other hand, if the user correctly inputs the user code and/or password, the messaging platform 100 may provide the user access to the music data stored on the platform 100. For instance, the messaging platform 100 may provide an audio touch tone menu that enables the user to navigate to a particular CD or a particular music track of a CD (operation S310). Such a touch tone menu is similar to existing touch tone menus that are frequently used to navigate to a voice mailbox or to navigate to a particular customer service department within a company. Clearly, the present invention is not limited to the use of touch tone menus, and a user may access and navigate through the data stored on the platform 100 via any electronic interface. Examples of other interfaces include (but are not limited to) the IVR interface, WAP interface, the SMS interface, the STK interface, and the HTML interface (via the Internet 140).

In one implementation, after a correct user code and password are entered, the following prerecorded or computer synthesized audio message may be transmitted to the user's access device:

To select a CD based on the artist who recorded the CD, please press "1".

To select a CD based on the title of the CD, please press "2".

To select a CD based on the type of music recorded on the CD, please press "3".
To select a CD based on the title of a song recorded on the CD, please press "4".
To hear a list of the most popular CDs based on sales, please press "5".
To hear a list of the most recently released CDs, please press "6".
To hear a list of CDs with discounted sales prices, please press "7".
To repeat the present menu, please press "8".
To speak with a customer service representative, please press "0"
To terminate the current session and return to the previous application, please press the pound sign.

Clearly, the options contained in the menu above are merely an examples of possible options, and virtually any type of option for searching for a particular CD or music track can be contained in the menu. In addition, if the user's access device contains a display (e.g. a telephone with a display device) or if the user is accessing the platform 100 with a personal computer via the Internet 140, the above menu may be graphically displayed as a visual menu instead of transmitted as an audio menu.

After listening to (or viewing) the menu, if the user inputs a "1" via the access device to select a CD based on the artist who recorded the CD, the following audio (or video) message may be transmitted to the access device:
Please enter the first six letters of the last name of the artist, followed by the pound sign (or the enter key).

If the user sequentially inputs "S", "P", "R", "I", "N", "G", and "#" (or <ENTER>), the following audio (or video) message may be transmitted to the access device:
To hear a list of CDs recorded by Bruce Springsteen, please press "1".
To hear a list of CDs recorded by Rick Springfield, please press "2".

If the user inputs a "1" via the access device, the following audio (or video) message may be transmitted to the access device:
To listen to music tracks from the "Born in the USA" CD, please press "1".
To listen to music tracks from the "Born to Run" CD, please press "2".
To listen to music tracks from the "Darkness on the Edge of Town" CD, please press "3".
To listen to music tracks from the "Ghost of Tom Joad" CD, please press "4".
To listen to music tracks from the "Human Touch" CD, please press
To listen to music tracks from the "Luckey Town" CD, please press "6".
To listen to music tracks from the "Nebraska" CD, please press "7".
To listen to music tracks from the "The River" CD, please press "8".
To hear a list of additional CDs, please press "9".

If the user inputs a "2" via the access device, the following audio (or video) message may be transmitted to the access device:
You have selected the "Born To Run" CD.
To listen to the music track "Thunder Road", please press "1".
To listen to the music track "Tenth Avenue Freeze-Out", please press "2".
To listen to the music track "Night", please press "3".
To listen to the music track "Backstreets", please press "4".
To listen to the music track "Born To Run", please press "5".
To listen to the music track "She's The One", please press "6".
To listen to the music track "Meeting Across The River", please press "7".
To listen to the music track "Jungleland", please press "8".

If the user inputs a "2" via the access device, the following audio (or video) message may be transmitted to the access device:
You have selected the "Tenth Avenue Freeze-Out" music track.
To fast forward twenty seconds within the music track, please press the "F" key once at any time while listening to the music track.
To jump to the next music track on the "Born to Run" album, please press the "F" key twice at any time while listening to the music track.
To rewind twenty seconds within the music track, please press the "B" key once at any time while listening to the music track.
To jump to the previous music track on the "Born to Run" album, please press the "B" key twice at any time while listening to the music track.
To select from various options relating to the music track, please press the "O" key once.
To search for a new CD, please press the "S" key once.
To end the current session, please press the "E" key once.

After the menu is transmitted to the access device of the user, the music data relating to the "Tenth Avenue Freeze-Out" music track is reproduced from the corresponding mailbox in the messaging platform 100, converted into an audio signal, and transmitted to the user's access device. As a result, the user can listen to the music track via his access device (operation S315). As noted in the menu above, the user can fast forward or rewind the "Tenth Avenue Freeze-Out" music track by pressing the "F" key or "B" key on his or her access device once. Also, the user can jump to other tracks on the "Born to Run" CD by quickly pressing the "F" key or "B" key twice.

In addition, the user can press "O" key once to hear a list of options relating to the "Tenth Avenue Freeze-Out" music track or the "Born to Run" CD. For example, if the user inputs an "O", the the following audio (or video) option menu may be transmitted to the access device:
To purchase or download the "Born to Run" CD, please press "1".
To save the "Tenth Avenue Freeze-Out" music track, please press "2".
To access other applications relating to the "Tenth Avenue Freeze-Out" music track, please press "3".

If the user wishes to purchase or download the "Born to Run" CD and inputs a "1" (operation S320), the messaging platform 100 performs a purchasing routine (operation S325).

In the purchasing routine, an audio (or video) menu may be transmitted to the user's access device to provide the user with various purchase options. An example of such a menu is provided below:
To have a copy of the "Born to Run" CD mailed to an address that you have previously provided to the multimedia vendor, please press "1".
To have a copy of the "Born to Run" CD mailed to an address that you have not previously provided to the multimedia vendor, please press "2".

To download the music data for the "Born to Run" CD to an e-mail address or computer site that you have previously set up with the multimedia vendor, please press "3".

To download the music data for the "Tenth Avenue Freeze-Out" music track to an e-mail address or computer site that you have previously set up with the multimedia vendor, please press "4".

To download the music data for the "Born to Run" CD to an e-mail address or computer site that you have not previously set up with the multimedia vendor, please press "5".

To download the music data for the "Tenth Avenue Freeze-Out" music track to an e-mail address or computer site that you have not previously set up with the multimedia vendor, please press "6".

If the user chooses to have the CD or music track mailed to a postal address or downloaded to an e-mail address or computer site that the user has not previously set up with the multimedia vendor, the user is provided with an opportunity to input such information via his or her access device. Alternatively, the user is connected with a customer service operator so that the user can orally provide such information to the operator. On the other hand, if the user chooses to have the CD or music track mailed to a postal address or downloaded to an e-mail address or computer site that the user has previously set up with the multimedia vendor, the CD or music track is mailed or downloaded to such location.

After the user selects an option to purchase the "Born to Run" CD or "Tenth Avenue Freeze-Out" music track, an audio (or video) payment option menu may be transmitted to the user's access device. The following is an example of a payment option menu:

To pay for your purchase with a credit card, please press "1".

To pay for your purchase with a pre-paid account that you has previously established with the multimedia vendor, please press "2".

To have a bill for your purchase sent to a postal address that you previously set up with the multimedia vendor, please press "3".

To have a bill for your purchase sent to an e-mail address that you previously set up with the multimedia vendor, please press "4".

To have a bill for your purchase sent to a postal address that you have not previously set up with the multimedia vendor, please press "5".

To have a bill for your purchase sent to an e-mail address that you have not previously set up with the multimedia vendor, please press "6".

If the user chooses to pay for the purchase of the CD or music track via a credit card, the messaging platform 100 may instruct the user to input the necessary credit card information via his or her access device. Then, the platform 100 instructs the payment logic 160 to perform the necessary functions to charge the user's credit card. If the user chooses to have a bill for the purchase mailed to a postal address or downloaded to an e-mail address or computer site that the user has previously set up with the multimedia vendor, the messaging platform 100 instructs the payment logic 160 to generate a bill that is addressed to the user's postal or e-mail address. On the other hand, if the user chooses to have a bill for the purchase mailed to a postal address or downloaded to an e-mail address or computer site that the user has not previously set up with the multimedia vendor, the messaging platform 100 instructs the user to input the necessary information and then instructs the payment logic 160 to generate a bill that is addressed to the user's postal or e-mail address. Alternatively, if the user selects any one of the payment options mentioned above, the messaging platform 100 may connect the user to customer service operator so that the user can orally provide the necessary information to the operator. Then, the operator processes such information to appropriately obtain payment from the user for his or her purchase.

If the user does not input a "1" in response to the option menu to purchase the "Born to Run" CD or the "Tenth Avenue Freeze-Out" music track (operation S315), the user may input a "2" to save the "Tenth Avenue Freeze-Out" music track (operation S330). When the user inputs a "2", a track saving routine is performed (operation S335) that enables the user to perform various customized operations with the music track. For example, when the track saving routine is performed, the following audio (or video) track saving menu may be transmitted to the user's access device:

To save the "Tenth Avenue Freeze-Out" music track as one of the tracks for your customized CD, please press "1".

To save the "Tenth Avenue Freeze-Out" music track as one of the tracks for your customized radio channel, please press "2".

To review a list of previously saved tracks for your customized CD, please press "3".

To review a list of previously saved tracks for your customized radio channel, please press "4".

To forward the "Tenth Avenue Freeze-Out" music track to an individual or group, please press "5".

If the user inputs a "1", the "Tenth Avenue Freeze-Out" music track is saved in a CD mailbox that is assigned to the user. By saving the "Tenth Avenue Freeze-Out" music track and other music tracks in the CD mailbox, the user can create a customized CD containing the stored tracks. For example, after storing a music track in the CD mailbox, the multimedia system may enable the user to purchase a customized CD containing all of the music tracks stored in the CD mailbox and have the CD mailed to a postal address or downloaded to an e-mail address. The manner in which the user selects to receive and purchase the customized CD may be similar to the above-described manner in which the user selects to receive and purchase the "Born to Run" CD. Also, as noted above, the user can input a "3" to hear a list of all of the music tracks stored in the CD mailbox. In addition, although not specifically indicated in the menu above, the track saving routine provides the user with the option to delete all of the songs contained in the CD mailbox or to delete selected songs from the mailbox.

Instead of storing the "Tenth Avenue Freeze-Out" music track in the CD mailbox to create a customized CD, the user can input a "2" in response to the track saving menu to create a customized radio channel. Specifically, after inputting a "2", the music track is stored in a radio channel mailbox that is assigned to the user. Then, as described in more detail below, the user can instruct the messaging platform 100 to repeatedly playback all of the music tracks stored in the radio channel mailbox. Also, as noted above, the user can input a "4" to hear a list of all of the music tracks stored in the radio channel mailbox. In addition, although not specifically indicated in the menu above, the track saving routine provides the user with the option to delete all of the songs contained in the radio channel mailbox or to delete selected songs from the mailbox.

In the above examples, one or more music tracks are stored in the CD mailbox or the radio channel mailbox, but the present invention is clearly not limited to such an implementation. For example, one or more pointers or links, which indentify the storage locations of the music tracks, may be stored in the CD or radio channel mailbox. Thus, when the user wishes to listen to or purchase the music tracks "stored" in the CD or radio mailbox, the pointers or links are evaluated and the corresponding music tracks are retrieved from their respective storage locations.

Finally, if the user inputs a "5" in response to the track saving menu, the user is provided with the option of forwarding the track to a voice mailbox or an e-mail address of a one or more people. For example, after selecting the option to forward the music track, the user may be provided with the opportunity to input one or more telephone numbers. After the user inputs the telephone numbers, the messaging platform 100 dials the numbers and reproduces the music track when the recipients answer their respective telephones or when the voice mailboxes or answering machines corresponding to the telephones are activated. Furthermore, the user may also be provided with the option of forwarding a personalized voice message along with the music track. In addition, instead of forwarding the actual music track to a mailbox of another person, the user may forward a corresponding pointer or link to the other person's mailbox.

Also, instead of or in addition to providing the user with the opportunity to input one or more telephone numbers, the track saving routine may enable the user to input one or more e-mail addresses via his or her access device. If the user inputs an e-mail address, the music data for the music track (or pointer or link) is forwarded to such an e-mail address. Also, the user may be provided with the option of forwarding a personalized text message along with the music track (or pointer or link).

Moreover, the track saving routine may also enable the user to create and save personal distribution lists containing phone numbers and/or e-mail addresses. Thus, when a user wishes to forward a music track (or pointer or link) to the phone numbers and/or e-mail addresses contained in a certain personal distribution list, the user does not have to spend a substantial amount of time inputting the multiple phone numbers and/or e-mail addresses, but can merely select the certain personal dististribution list.

If the user does not input a "1" or a "2" in response to the option menu (operations S315 or S330), the user may input a "3" to access other applications relating to the "Tenth Avenue Freeze-Out" music track (operation S340). When the user inputs a "3", an application routine is performed (operation S345) that enables the user to access various applications relating to the music track. For example, when the application routine is performed, the following audio (or video) track saving menu may be transmitted to the user's access device:

To learn more information about the "Born to Run" CD or the "Tenth Avenue Freeze-Out" music track please press "1".

To add the "Tenth Avenue Freeze-Out" music track to your listening profile, please press "2".

To engage other users with similar profiles in a forum, please press "3".

To join a chat group to discuss the "Tenth Avenue Freeze-Out" music track, please press "4".

To listen to your customized radio channel, please press "5".

If the user inputs a "1", the user is provided with additional facts regarding the "Tenth Avenue Freeze-Out" music track and/or the "Born to Run" CD. Such information may include the date that the music track and CD were produced, background information regarding the musicians and singers who produced the music track and CD, etc.

If the user inputs a "2", the user modifies his or her "listening profile" in accordance with various characteristics associated with the "Tenth Avenue Freeze-Out" music track or the "Born to Run" CD. A "listening profile" identifies the types of artists, music, CDs, music tracks, etc. that a particular user enjoys. Thus, when the user desires to modify his or her profile in accordance with the "Tenth Avenue Freeze-Out" music track or the "Born to Run" CD, the profile may be modified to indicate that the user enjoys classic rock and roll, enjoys music from Bruce Springsteen, enjoys artists who were born in New Jersey, and enjoys the "Born to Run" CD.

If the user desires to exchange information with other people who have a similar type of listening profile as the user, the user may input a "3" in response to the option menu. When the user inputs a "3", the messaging platform 100 evaluates the user's listening profile and searches for other selected users that have similar profiles. Then, the messaging platform 100 outputs a signal to the selected users to inform them that a user exists that has a similar listening profile and who would like to exchange information with them. For example, the messaging platform 100 may dial telephone numbers of the selected users to call the selected users. If one or more of the selected users answers the call from the message platform 100, the responsive selected users are connected with the original user so that the original user and the responsive selected users can communicate with each other to discuss their common interests.

Alternatively, if the original user is interacting with the messaging platform 100 with his or her computer via the Internet 140, the platform 100 may send an e-mail to the selected users. In such case, if one or more of the selected users respond via an e-mail, the messaging platform 100 may establish a chat room in which all of the users can send textual messages to each other in real time.

If the user inputs a "4" in response to the option menu, the user application routine will connect the user to a chat room (e.g. a telephone "party line" or an Internet-type chat room) containing other users who are currently discussing a particular topic. In the specific example noted above, a group of users in the chat room are talking about the "Tenth Avenue Freeze-Out" music track. However, the topic being discussed in the chat room may be different depending on various circumstances. For example, if Bruce Springsteen is available to speak with users, the option contained in the option menu may state (or read):

To join a chat group and talk live with Bruce Springsteen, please press "4".

If the user wishes to listen to his or her customized radio channel, he or she can input a "5" in response to the option menu. Based on such input, the messaging platform 100 repeatedly plays back all of the music tracks that were stored in the radio channel mailbox during the track saving routine (operation S335) so that the user can listen to the music tracks via his or her access device.

Also, as noted in FIG. 3, the user can return to listening to the selected music track (operation S315) after the purchasing routine, track saving routine, or application routine is performed (operation S325, S335, or S345). Also, any manner can be used to return the user to listening to the selected music track (operation S315). For example, an additional menu option may be included in the menus above that indicate that the user can resume listening to the selected music track by pressing a particular button on the access device.

If the user does not select from various options relating to the music track (operations S320, S330, and S340), the user can select another music track by pressing the "S" button once (operation S350). When the "S" button is pressed, the various menus described above for navigating through the various CDs and music tracks are transmitted to the user's access device (operation S310).

On the other hand, if the user does not wish to select another music track (operation S350), the user can end the current session with the messaging platform 100 by pressing the "E" key on his or her access device (operation 355). If the user presses the "E" key, the communication link between the user's access device and the messaging platform 100 is terminated.

In addition, in order to entice users to purchase particular music tracks or CDs or to interact with the messaging platform 100, the multimedia system may give "electronic coupons" to all users or to selected users. Then, the users can selectively redeem the coupons for free or discounted music tracks or CDs. For example, when a user logs into the system and initially accesses the messaging platform 100, the platform 100 may output a signal or a message to the user's access device to inform the user that he has received an electronic coupon. For example, the electronic coupon may contain the following message:

To purchase the "Born to Run" CD by Bruce Springsteen at a discounted price of $7.00, please press "1".

If you are not interested in purchasing the CD, please press "2".

If the user inputs a "1" in response to the "electronic coupon", the purchasing routine may be performed to provide the user with various options for purchasing the "Born to Run" CD (operation S325). In addition to or instead of redeeming the electronic coupon, the user may forward the electronic coupon to one or more users. For example, the user may instruct the messaging platform 100 to forward the electronic coupon to specified telephone numbers and/or e-mail addresses. Alternatively, the user can instruct the messaging platform 100 forward the coupon to users contained on a predefined personal distribution list. After receiving the electronic coupon from the original user, the recipient users can activate the electronic coupon (e.g. by inputting a "1") via their access devices and access the messaging platform 100.

In addition to using coupons, a user may also take advantage of "loyalty programs" to purchase music tracks or CDs at a discount or to receive complementary music tracks or CDs. For example, the user may be able to navigate through the system to an appropriate menu to redeem airplane miles, credit card points, etc. for free music tracks or CDs. Also, the multimedia system may contain its own "loyalty program" to offer a free CD or track when the user has purchased a certain number of CDs, tracks, or services.

Although the above examples are primarily focused on music and audio information, the multimedia system can easily accommodate other types of multimedia information. Specifically, the audio information stored in the mailboxes of the messaging platform 100 is merely data. Pictures, movies, video clips, and other visual information are also data that can be stored in such mailboxes. In addition, with the increasing amount of data that can be transmitted to mobile phones, mobile terminals, fixed terminals, and other communication devices, video information can be easily transmitted to such devices and displayed on a display incorporated within such devices. Accordingly, all of the same features that can be utilized in conjunction with audio data can also be used in conjunction with video data. Of course, a combination of audio and video information can also be supported by the system.

For example, the multimedia system can be used to distribute, share, and sell DVDs. Moreover, the system can be used to advertise any other products or services that require either audio or video demonstrations in the sales process. An example of a service that utilizes audio and video demonstrations in sales is the "shopping channel" service that is used by many cable television companies. However, in accordance with the present invention, the "shopping channel" service may be implemented via the messaging system 100.

As described above, the present invention has many advantages. In one implementation, the multimedia system utilizes telephony based messaging platforms (rather than Internet based platforms) as a mechanism for distributing, sharing, and purchasing multimedia information. Thus, the multimedia system enables users ubiquitous access from numerous devices and can be easily adapted to operate in existing telephony based environments.

Also, in relying on existing telephony-based platforms, the multimedia system according to one embodiment is more robust, scalable, fast, and reliable than any existing HTML solution. For example, current messaging platforms are designed for telco-grade operations and are also redundant. Specifically, in the Trilogue INfinity system, key components are duplicated, thereby making every single one of the key components redundant. This feature makes the whole system extremely reliable and stable because it allows the system to be operational even when one of its parts malfunction. As a result, such a multimedia system ensures a high level of availability that is unknown by today's e-commerce standards. Also, since one implementation of the multimedia system relies on tested and proven platforms (i.e. telephony platforms) as well as upon well-known subscriber interaction procedures, and since messaging platforms are in use by virtually every operator world-wide, the multimedia system can be deployed and operated very rapidly and can quickly gain a mass audience.

As noted in the illustrative, non-limiting example in FIG. 3, the user is charged a fee when he or she desires to purchase music data. (Operations S320 and S325). However, the present invention is clearly not limited to such a billing scheme. For example, the user may be additionally or alternatively charged a fee based on the amount of time that he or she is navigating to a particular CD or a particular music track of a CD (operation S310) or the amount of time that he or she is listening to music data (operation S315). Also, the user may additionally or alternatively be charged a fee based on the amount of time spent saving a music track for a customized CD or customized radio channel, reviewing previously saved tracks for the customized CD or customized radio channel, playing back music tracks relating to the customized radio channel, or forwarding a music track (or pointer or link of the music track) to an individual or group. (Operations S335 and S345). Furthermore, the user may be charged for the amount of time spent performing various applications relating to a music track, such as learning more information about the music track or the CD containing the music track, adding the music track to the user's listening profile, engaging other users with similar profiles in a forum, or joining a chat group to discuss the music track (Operation S345). In addition, to the services and products mentioned above, the user may be charged a fee for accessing any other service or product as well.

The user can be charged for accessing the various services or products above in virtually any manner. For example, the user may pay for such services or products by using a credit card. In one implementation, the user pays with a credit card via the IVR or voice interface mentioned above. Also, the user may pay for the services or products by having fees or charges deducted from a pre-paid account that the user has previously established with the multimedia system. Additionally, a bill may be generated and sent to the user via regular mail, electronic mail, or in any other form. Furthermore, the user may pay for the services or products via the various types of coupons described above.

In addition, instead of charging the user for the amount of time spent to access the various products or services, the user may be charged a "fixed fee" each time he or she accesses any or all of the products or services. Alternatively, the user may pay a monthly or other periodic fee for unlimited access to any or all of the products or services.

In addition to the services and products mentioned above, the system may enable the user to download a particular "ringtone". A ringtone is the sound the user's phone makes when an incoming call is received. For example, some phones have prestored ringtones corresponding to an excerpt from Beethoven's "Ninth Symphony", an excerpt from the "National Anthem", or other popular tunes. In such phones, the user can select one of the prestored ringtones (i.e. the "Ninth Symphony"), and when the user receives a telephone call, the phone plays the "Ninth Symphony" instead of ringing. In an embodiment of the present invention, the user can navigate to a particular music track and can select the music track as his or her ringtone by inputting various menu selections or other commands in a manner similar to one of the manners described above. After the user selects such a music track, the system downloads the music track (or a portion of the music track) to the user's phone, and the user's phone stores the music track (or the portion of the music track) as the ringtone for the phone. Alternatively, the system may download the music track (or portion of the music track) to a personal computer of the user, and the user transfers the music track data from the personal computer to his or her phone. The user can be charged for downloading ringtones in any of the manners described above.

In an additional or alternative implementation of the system, a user can navigate to a particular CD or music track based on the music tracks being played on a particular radio station. For example, if a user is listening to a particular radio station (e.g. WHFS 99.1 FM™) and hears a particular music track that appeals to him or her, the user can access the system (Operation S305) and navigate to the particular music track broadcast on the radio (Operation S310). In a non-limiting example, the user selects an option from a menu that enables him or her to input a number or other data that identifies the particular radio station. For instance, if the radio station is WHFS 99.1 FM™, the user may input "9-9-*-1" via his or her phone and then press the pound sign "#". Alternatively, the user can input such information in any of the manners described above. In any event, after the user inputs the radio station, the system may provide the user with a menu containing the title of the music track of the currently broadcast music track and the titles of a predetermined number of the most recently broadcast music tracks. An example of such a menu is provided below:

To select options relating to the currently broadcast music track, "Thunder Road", please press "1".
To select options relating to the previously broadcast music track, "Stairway to Heaven", please press "2".
To select options relating to the previously broadcast music track, "Magic", please press "3".
To select options relating to the previously broadcast music track, "Tommy", please press "4".
To select options relating to the previously broadcast music track, "Welcome to the Jungle", please press "5".

When one of the options is selected, the user may be provided with the option of purchasing the music track or CD containing the music track, forwarding the music track to an individual or group, saving the music track for customized CD or customized radio channel, downloading the music track as a ringtone, or accessing any of the other products or services that relate to the music track or CD containing the music track and that are mentioned above. In addition, the user can be charged for accessing such services or products in any of the manners described above.

Upon reading the present specification, one skilled in the art will readily understand how the system can determine the music tracks currently and previously broadcast from one or more radio stations. For example, in one implementation, the radio stations may embed data in the audio data corresponding to the music track currently being broadcast. The embedded data may identify the name of the music track being broadcast, the name of the CD containing the music track, the names of the artist, singer, composer, lyricist, etc. of the music track, and information identifying the radio station broadcasting music track. In such a scenario, the system extracts the embedded data via conventional techniques and creates a record of the currently broadcast music track and of a predetermined number of the most recently broadcast music tracks. Then, when a user accesses the system and inputs data identifying a particular radio station, the system is able to provide the user with an appropriate menu, which is similar to the menu discussed above.

In addition, some radio stations have web sites on the Internet, and the web sites contain play list information regarding the music tracks that are scheduled to be broadcast from the radio station and the broadcast times of the music tracks. In such a scenario, the system may periodically download such play list information from the radio stations and use such information to create a record of the currently broadcast music track and of a predetermined number of the most recently broadcast music tracks.

Alternatively, an operator of the system may retrieve such play list information from the radio station web sites and manually enter the music tracks that are scheduled to be broadcast and the their respective broadcast times. Then, based on the manual entries, the system may create a record of the currently broadcast music track and of a predetermined number of the most recently broadcast music tracks.

In yet a further implementation, the owner of the system may have an agreement with the radio stations. As part of the agreement, the radio stations may specially transmit or otherwise transfer data to the system regarding the music tracks that are scheduled to be broadcast and their broadcast times. Alternatively, the radio stations may provide a "hard copy" or an "electronic copy" of a document containing such information. In such a case, an operator may review the document and manually input the broadcast information to the system. Then, the system may create a record of the currently broadcast music track and of a predetermined number of the most recently broadcast music tracks based on the information.

When the user hears a particular music track on the radio and accesses the system to select options relating to the music track, the radio acts as a "trigger" which causes the user to access the system of the present embodiment. In addition, the radio is not the only trigger that can motivate the user to access the system. For example, when someone forwards a particular music track (or pointer to the particular music track) to the voice mailbox of the user, such music track (or pointer) may act as a trigger for the user to access the system.

In one implementation, after the user listens to the forwarded music track, the user may be provided with the option of accessing the system. For instance, after the user has finished listening to the music track, the message "To learn more about this music track or to access various services or products relating to this music track, please press the pound sign". In response to such message, if the user presses the pound sign "#", a link may be activated to enable the user to access the system in one of the manners described above. If the user accesses the system, he can select any of the features, products, or services described above. Furthermore, the user can be charged a fee for accessing the system in any of the manners described above.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents thereof.

What is claimed is:

1. An apparatus for storing predetermined multimedia information, comprising:
   a telephony platform comprising a processor;
   a storage device having therein a storage location coupled to said telephony platform,
   said storage device storing predetermined multimedia information corresponding to a plurality of predetermined information tracks in said storage location,
   wherein said telephony platform is configured to receive at least one multimedia command from an access device of a user, and
   in response to said at least one multimedia command, said telephony platform enables said user to access a service of said apparatus relating to a particular information track of said predetermined information tracks so that said particular information track is downloaded to an email address or a computer network address,
   wherein said particular information track is a music track and said at least one multimedia command further enables said user to access additional information relating to said music track, said additional information discussed in a chat group interested in said music track,
   wherein said telephony platform is configured to charge said user a fee for accessing said service.

2. The apparatus according to claim 1, wherein said service relates to purchasing said particular information track.

3. The apparatus according to claim 1,
   wherein said service comprises a search operation performed by said user via said access device to search for said music track stored in said storage location.

4. The apparatus according to claim 1,
   wherein said service comprises listening to said music track via said access device.

5. The apparatus according to claim 1,
   wherein said service comprises saving said music track as at least part of a customized CD.

6. The apparatus according to claim 1,
   wherein said service comprises saving said music track as at least part of a customized radio channel.

7. The apparatus according to claim 1,
   wherein said service comprises replaying a customized radio channel containing said music track.

8. The apparatus according to claim 1,
   wherein said service comprises forwarding data relating to said music track to a second access device of a second user.

9. The apparatus as claimed in claim 8, wherein said forwarded data is stored in a second storage location corresponding to said second access device, and
   wherein said forwarded data comprises access data enabling said second user to access said telephony platform via said second access device.

10. The apparatus according to claim 1,
    wherein said service comprises downloading at least a portion of said music track to be used as a ringtone for said access device.

11. The apparatus according to claim 1,
    wherein said service comprises accessing said music track by inputting radio channel information via said access device, and
    wherein said radio channel information identifies a radio station that is broadcasting said particular music track or has recently broadcasted said particular music track.

12. The apparatus according to claim 1, wherein said particular information track is additionally stored on said access device.

13. A method for storing predetermined multimedia information, comprising:
    supplying a multimedia command from an access device of a user to a telephony platform;
    accessing a service relating to a particular information track based on said multimedia command, said particular information track comprising a music track, wherein said music track is represented by predetermined multimedia information stored in a storage location coupled to said telephony platform;
    charging said user a fee for accessing said service; and
    downloading said music track, based on said multimedia command, to an email address or computer network address,
    said method further comprising accessing additional information relating to said music track, wherein said additional information corresponds to information discussed in a chat group interested in said particular music track.

14. The method according to claim 13, wherein said service includes an operation of purchasing said music track.

15. The method according to claim 13, further including performing a search operation by said user via said access device to search for said music track stored in said storage location.

16. The method according to claim 13, wherein said method further comprises listening to said music track via said access device.

17. The method according to claim 13, wherein said method further comprises saving said music track as at least part of a customized CD.

18. The method according to claim 13, wherein said method further comprises saving said music track as at least part of a customized radio channel.

19. The method according to claim 13, wherein said method further comprises replaying a customized radio channel containing said music track.

20. The method according to claim 13, wherein said method further comprises forwarding data relating to said music track to a second access device of a second user.

21. The method according to claim 20, wherein said forwarded data is stored in a second storage location corresponding to said second access device, and wherein said forwarded data comprises access data enabling said second user to access said telephony platform via said second access device.

22. The method according to claim 13, wherein said method further comprises downloading at least a portion of said music track to be used as a ringtone for said access device.

23. The method according to claim 13, wherein said method further comprises accessing said music track by inputting radio channel information via said access device, and wherein said radio channel information identifies a radio station that is broadcasting said particular music track or has recently broadcasted said particular music track.

24. The method according to claim 13, wherein said access device is a wireless device.

25. The method according to claim 13, wherein said access device is a telephone.

* * * * *